J. W. LEFFERTS.
FILTER.
No. 176,651. Patented April 25, 1876.
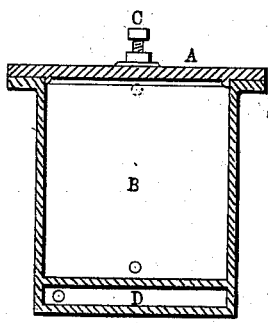
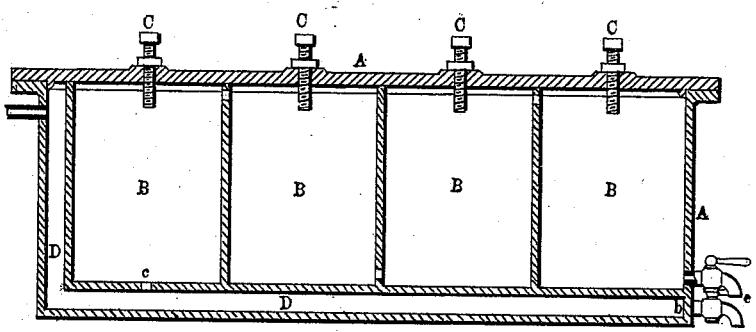
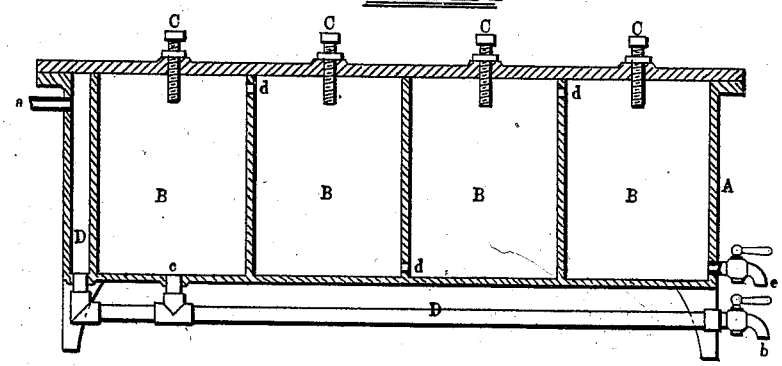

UNITED STATES PATENT OFFICE

JOHN W. LEFFERTS, OF BALTIMORE, MARYLAND.

IMPROVEMENT IN FILTERS.

Specification forming part of Letters Patent No. 176,651, dated April 25, 1876; application filed March 4, 1876.

*To all whom it may concern:*

Be it known that I, JOHN W. LEFFERTS, of the city of Baltimore, State of Maryland, have invented certain new and useful Improvements in Filters, of which the following is a specification; and I do hereby declare that in the same is contained a full, clear, and exact description of my said invention, reference being had to the accompanying drawing, and to the letters of reference marked thereon.

My invention relates to a filter having, in combination with the filtering-chambers, certain packing devices, hereinafter described, and an auxiliary channel or duct, through which unfiltered water may be drawn, and the first of the filtering-chambers cleansed of mud or sediment deposited therein in the ordinary operation of the filter.

In the further description of my invention which follows, due reference must be had to the accompanying drawing, forming a part of this specification, and in which—

Figure 1 is a longitudinal section of my improved filter, and Fig. 2 a transverse section of the same. Fig. 3 illustrates a modified arrangement of the various parts of the filter.

Similar letters of reference indicate similar parts of the invention in all the figures.

A is the casing of the filter, and B the filtering-chambers, packed with suitable filtering material. C C are screws located in the lid of the filter and over the several filtering-chambers, to be screwed down and into the filtering material, to place a pressure thereon, and to cause the said material to fill any vacant spaces left in the filling operation. D is a channel or duct, into which the unfiltered water is directly admitted. The inlet and outlet apertures for the unfiltered water are represented, respectively, by $a$ and $b$, and the communicating passage between the duct D and the first of the filtering-chambers by $c$. The means of communication between the several chambers B are the perforations $d$, situate in the partitions separating the chambers, the perforations being relatively arranged to cause the water, in passing through the filter, to take a circuitous course before reaching the discharge-orifice $e$.

In my improved filter the communicating passage $c$, which is first to receive the mud from the water, is cleaned by the gradual falling of the particles of deposit to the duct D when the filter is not in use, the said particles being carried off with the unfiltered water upon opening the faucet at the outlet-aperture $b$.

In Fig. 3 a portion of the channel or duct D consists of a pipe screwed into the under side of the filter, with a connection extending therefrom to a point directly below the first filtering-chamber.

My improved filter is specially adapted for use in localities where the water is not sufficiently muddy to require filtering for all purposes.

The use of the unfiltered water prevents the unnecessary clogging of the filtering material in the chambers not in direct communication with or cleansed by means of the duct D.

It will be observed that the duct D, which connects with the supply-pipe $a$, can be used to carry off unfiltered water at any time by opening the cock $b$. Thus, should from any cause the supply to the filter be too great, the surplus water can be carried off through the duct and cock $b$, and at the same time the impurities will be cleared away; or, should it be desired to practically stop the filtering process, the great body of the unfiltered water can be passed through the duct and cock $b$.

Having thus described my invention, what I claim as new, and wish to secure by Letters Patent of the United States, is—

The covered box A, provided with the duct D, into and from which the unfiltered water is passed, the communicating filtering-chambers B, passage $c$, inlet $a$, outlet $b$, and discharge-orifice $e$, substantially as and for the purposes herein specified.

In testimony whereof I have hereunto subscribed my name this 2d day of March, in the year of our Lord 1876.

JOHN W. LEFFERTS.

Witnesses:
WM. T. HOWARD,
JNO. T. MADDOX.